US006374288B1

(12) United States Patent
Bhagavath et al.

(10) Patent No.: US 6,374,288 B1
(45) Date of Patent: Apr. 16, 2002

(54) DIGITAL SUBSCRIBER LINE SERVER SYSTEM AND METHOD FOR DYNAMICALLY CHANGING BIT RATES IN RESPONSE TO USER REQUESTS AND TO MESSAGE TYPES

(75) Inventors: Vijay K. Bhagavath, Lincroft, NJ (US); Joseph Thomas O'Neil, Staten Island, NY (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/233,283

(22) Filed: Jan. 19, 1999

(51) Int. Cl.$^7$ ............................................. G06F 15/16
(52) U.S. Cl. ...................... 709/203; 709/223; 709/224; 709/217; 375/222
(58) Field of Search ................................ 709/201, 202, 709/203, 217, 219, 222, 224, 225, 227, 229, 223, 238, 250; 375/222, 219, 229, 230, 235; 370/485, 230, 235, 420, 401; 379/93.28, 114; 714/4

(56) References Cited

U.S. PATENT DOCUMENTS

| | | | | |
|---|---|---|---|---|
| 5,751,701 A | | 5/1998 | Langberg et al. ............ 370/281 |
| 5,787,470 A | | 7/1998 | DeSimone et al. .......... 711/124 |
| 5,835,718 A | | 11/1998 | Blewett .................. 395/200.48 |
| 5,852,717 A | | 12/1998 | Bhide et al. ............ 395/200.33 |
| 5,862,203 A | * | 1/1999 | Wulkan et al. ............. 379/114 |
| 5,982,784 A | * | 11/1999 | Bell ............................ 370/485 |
| 5,999,563 A | * | 12/1999 | Polley et al. ................ 375/222 |
| 6,044,403 A | * | 3/2000 | Gerszberg et al. .......... 709/225 |
| 6,047,319 A | * | 4/2000 | Olson ......................... 709/223 |
| 6,137,777 A | * | 10/2000 | Vaid et al. ................... 370/230 |
| 6,160,843 A | * | 12/2000 | McHale et al. ............. 375/222 |
| 6,223,221 B1 | * | 4/2001 | Kunz .......................... 709/224 |
| 6,260,155 B1 | * | 7/2001 | Dellacona ...................... 714/4 |
| 6,282,273 B1 | * | 8/2001 | McHale et al. .......... 379/93.28 |
| 6,304,574 B1 | * | 10/2001 | Schoo et al. ................ 370/401 |

* cited by examiner

Primary Examiner—Ayaz Sheikh
Assistant Examiner—Oanh L Duong

(57) ABSTRACT

A server platform is programmed to receive requests from the customer digital subscriber line modems for changing the customer's class of service for access to the Internet. The server platform can provide an immediate change in the bit rate of a platform digital subscriber line modem in response to a customer's request. The server platform can provide a service plan that automatically changes the bit rate of a platform digital subscriber line modem in response to a customer's request. The server platform can selectively provide a schedule that is followed to automatically change the bit rate of a platform digital subscriber line modem in response to a customer's request. In addition, the server platform can selectively provide an option to automatically increase the bit rate of a platform digital subscriber line modem when receiving streaming video or audio content from the Internet. A database is coupled to the Ethernet LAN to store the class of service status of each respective platform digital subscriber line modem.

29 Claims, 12 Drawing Sheets

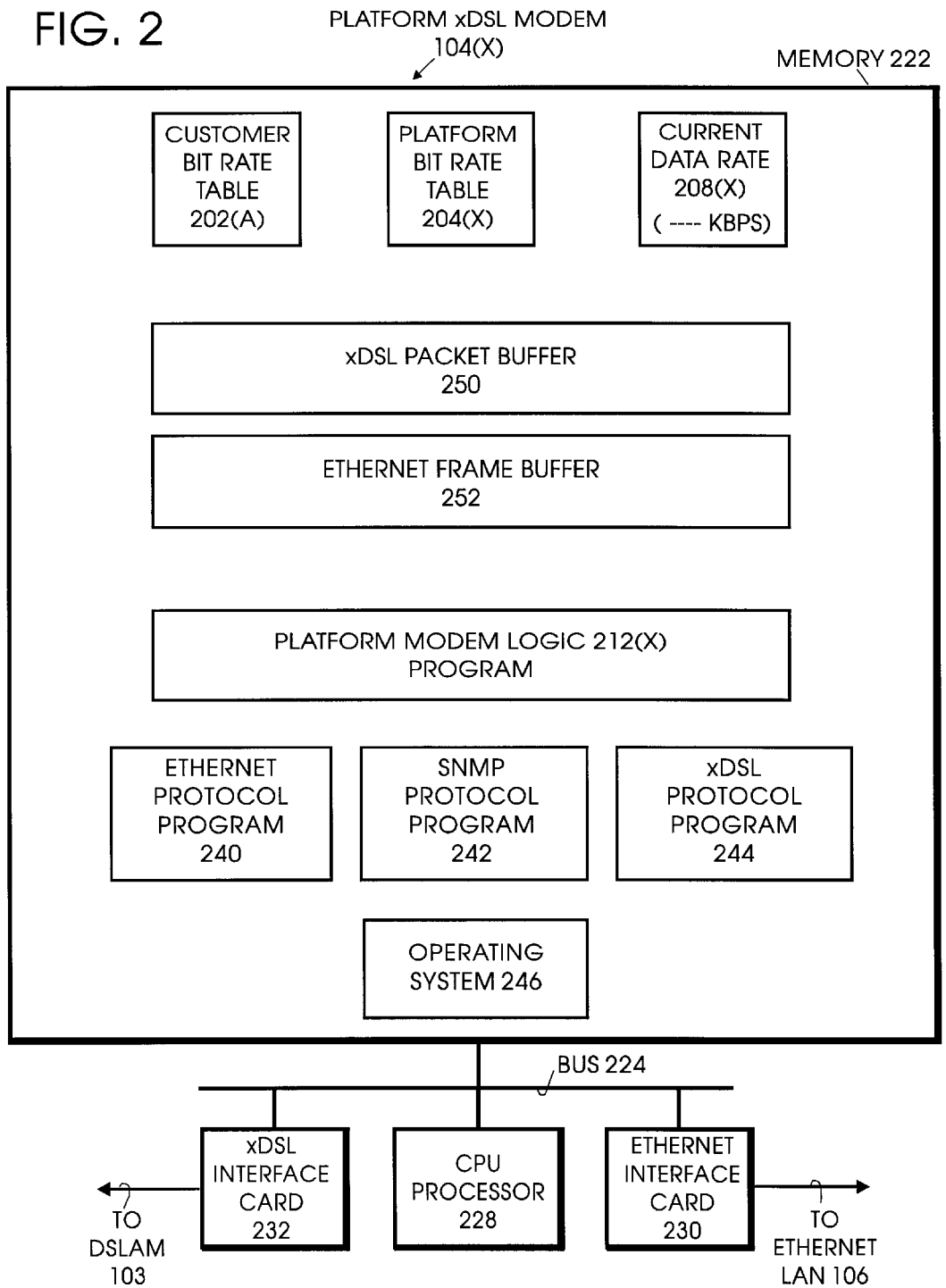

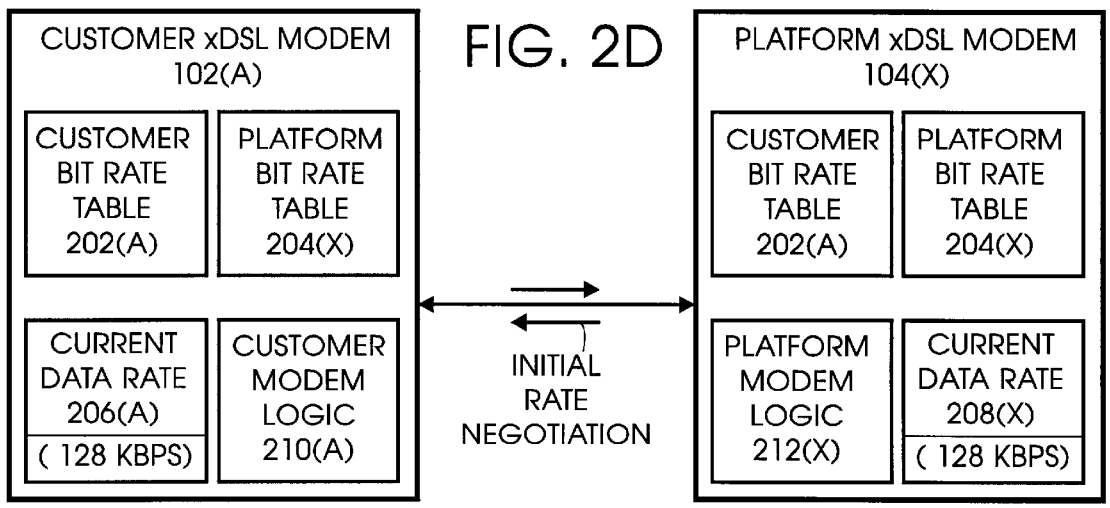
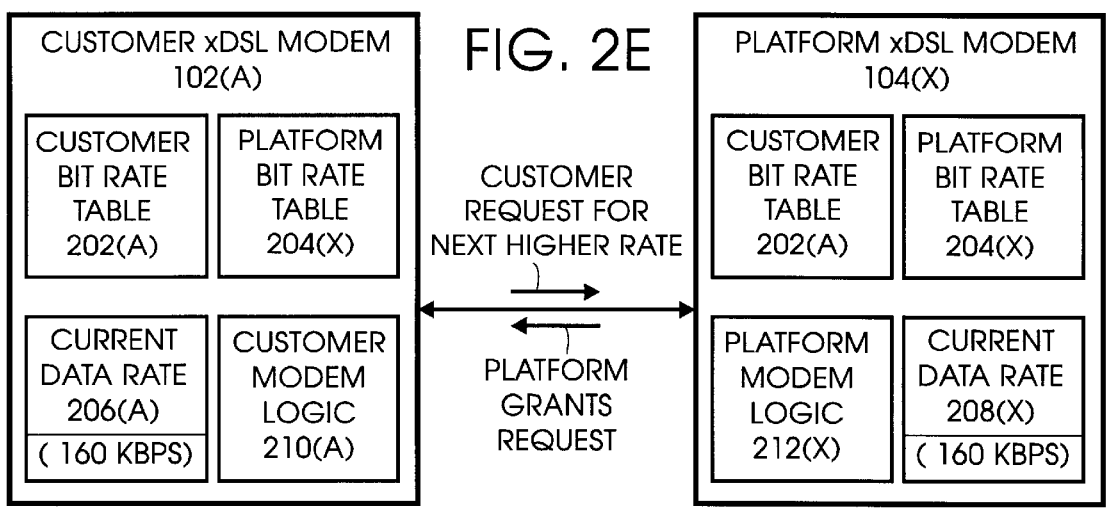
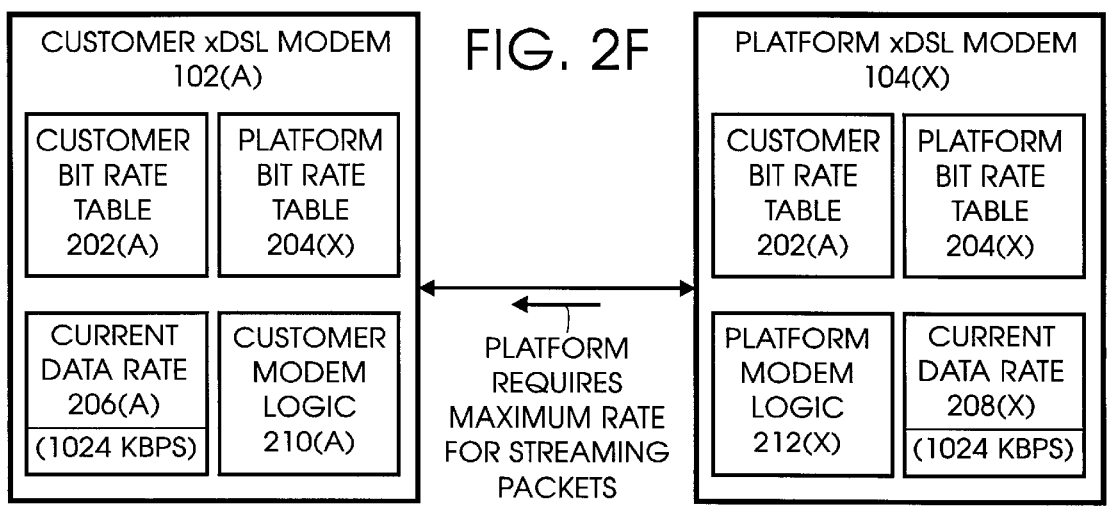

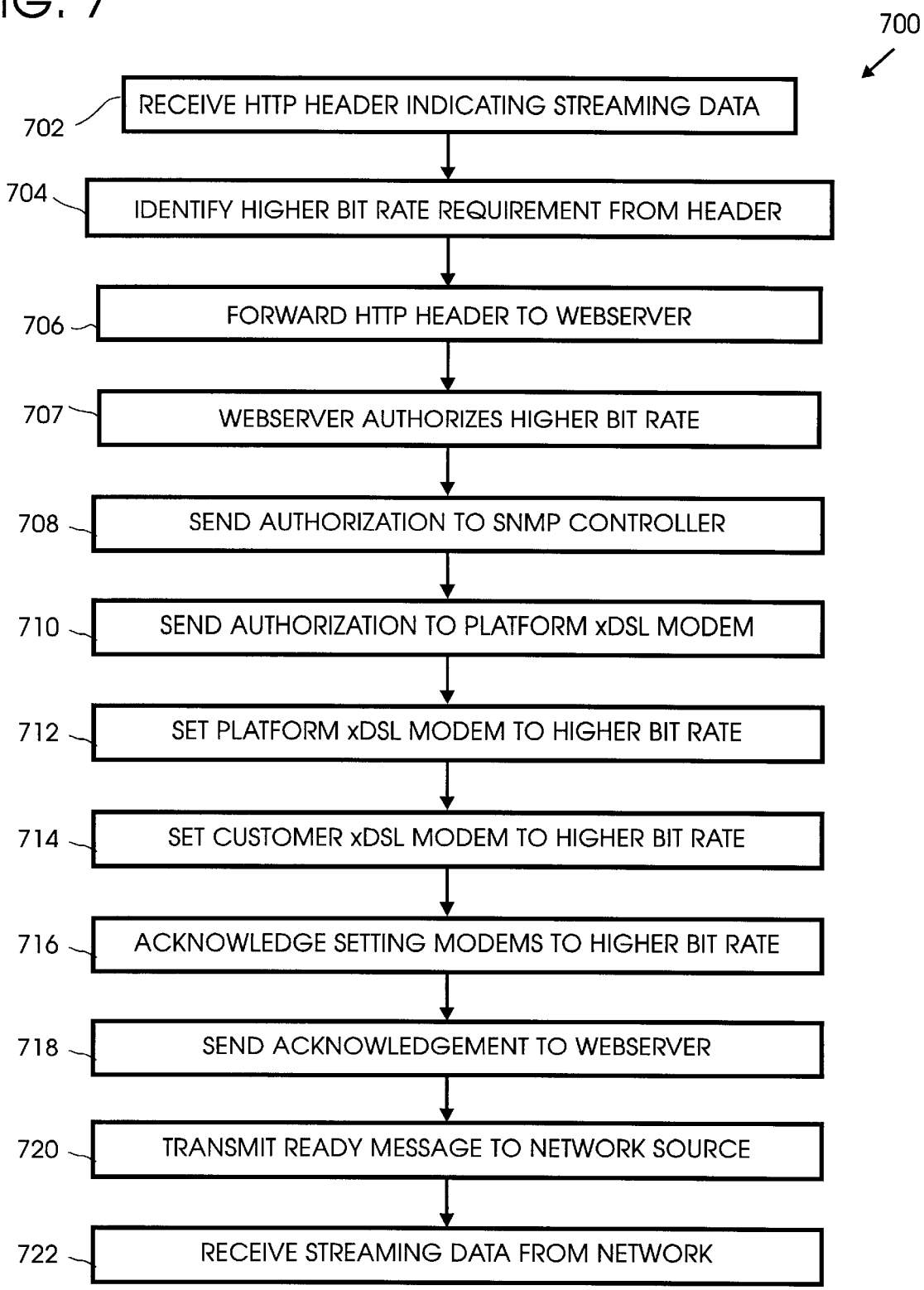

DIGITAL SUBSCRIBER LINE SERVER SYSTEM AND METHOD FOR DYNAMICALLY CHANGING BIT RATES IN RESPONSE TO USER REQUESTS AND TO MESSAGE TYPES

FILED OF THE INVENTION

The invention broadly relates to telecommunications and more particularly relates to improvements in digital subscriber line networks.

BACKGROUND OF THE INVENTION

There are several forms of the Digital Subscriber Line protocol, referred to collectively as "xDSL". They have the common feature of operating at high bit rates and with a high reliability over existing twisted pair copper lines. xDSL makes full use of the copper line frequency spectrum of approximately 2 MHz, it uses advanced modulation and coding methods, and it works simultaneously with the plain old telephone system (POTS) on the same copper line.

Twisted pair copper lines have a useable frequency spectrum of approximately 2 MHz, which depending on the length of the line, can be used for data communication at various bit rates. However, there are two limitations: first, the lower 4 kHz must be reserved for POTS signals where applicable, and second, the signal to noise ratio is not the same in all frequencies.

Discrete MultiTone (DMT) is a modulation technique used in xDSL technologies, that divides the frequency range into 256 sub-frequencies, from 64 kHz to 2 MHz. Each sub-frequency is an independent channel which has its own stream of signals . Asymmetric Digital Subscriber Line (ADSL) protocol, one of the family of xDSL protocols, defines a pilot stream of data which is known to both endpoints in advance. This pilot stream of data is transmitted on each sub-frequency to enable the endpoints to find the specific signal to noise ratio (SNR) for each sub-frequency. This information is used to allocate the data over the various sub-frequencies. The POTS signals in the lower 4 kHz band are separated by an analog splitter, thereby enabling telephone voice calls to simultaneously share the twisted pair copper line with ADSL digital signals. ADSL is asymmetric in its allocation of more bandwidth to the downstream signals from the network to the customer, compared with less bandwidth in the upstream direction.

The various forms of digital subscriber line (xDSL) technologies are known under the acronyms ADSL, HDSL, RADSL, SDSL, and VDSL. Their principal characteristics are reviewed as follows:

ADSL: Asymmetric digital subscriber line (ADSL) protocol is a passband modulation of coded information bit streams over the POTS twisted-pair two-wire telephony copper loop. This protocol uses two-dimensional modulation schemes such as carrierless amplitude-phase (CAP) or discrete multi-tone (DMT). Carrierless amplitude phase modulation (CAP) is a version of quadrature amplitude modulation (QAM) that stores parts of a modulated message signal in memory and then reassembles the parts in the modulated wave. The carrier signal is suppressed before transmission because it contains no information and is reassembled at the receiving modem (hence the word "carrierless" in CAP). Commercially available ADSL modems are capable of transmitting up to 8 Megabits per second (Mbps) downstream in the 240 kHz to 2 MHz loop frequency band and up to 1 Mbps upstream in the 25 kHz-200 kHz spectral band, simultaneously with 0–4 kHz telephony (POTS) signals. State-of-the-art ADSL modems typically employ rate-adaptation, with a granularity (e.g., 32 kbps for DMT and 320 kbps for CAP in current implementations) to increase or decrease the transmitted bit rate automatically in response to variations in loop noise conditions and loop lengths. The ADSL standard is described in American National Standards Institute (ANSI) standard T1.413, entitled "Telecommunications-Network and Customer installation Interfaces-Asymmetric Digital Subscriber Line (ADSL) Metallic Interface", (ADSL 6.1 Mbps).

HDSL: High-data-rate DSL (HDSL) is a four-wire (two-pair) access protocol for achieving symmetrical data transmission rates, conforming to either the T1 (1.544 Mbps) or E1 (2.048 Mbps) standards, using either baseband the ISDN encoding technique of two binary, one quaternary (2B1Q)or passband CAP (e.g., CAP64) modulation schemes. Fractional T1 or E1 rates are supported by most HDSL modem vendors using nx64 kbps clocking schemes. The HDSL spectrum in the copper loop extends approximately between 0–300 kHz for passband modulated-transmission (e.g., CAP64) and 0–425 kHz for baseband 2B1Q) modulated data transmission. In practice, commercially-available HDSL modems (specifically the baseband 2B1Q HDSL modems), do not support simultaneous transport of analog telephony and the HDSL modulated data signals.

RADSL: Rate-adaptive digital subscriber line (RADSL) adjusts transmission speed according to the length and quality of the local line. Connection speed is established when the line is initially synchronized or is set by a signal from the central office. This is similar to CCITT standard V.34 modems, which initialize communications with one another by first listing which bit rates they support. Then they go into a test mode to determine which of the supported bit rates is the highest one which can be used for each new connection. RADSL modems poll the line before transmitting and periodically monitor the line speed during a session to determine if it is necessary to change bit rates due to changes in the line condition. If the RADSL modems recognize that they are experiencing a very low error rate over a given time period, they can agree to go to a higher bit rate. Alternatively, they can go to a lower bit rate if line conditions indicate that too many errors have occurred during some period.

SDSL: Symmetric DSL (SDSL) protocol is a two-wire (single-pair) implementation of the ISDN encoding technique of two binary, one quaternary (2B1Q) or of the CAP modem technologies using state-of-the-art echo-cancellation and adaptive-equalization techniques. This achieves symmetric data transmission rates of 384 kbps, 768 kbps, 1 Mbps, 1.5 Mbps, or 2 Mbps . Sub-T1/E1 rates can be obtained using nx64 kbps clocking techniques.

VDSL: Very-high-speed DSL protocol supports data transmission rates of 6.5 Mbps to 51.8 Mbps (the Synchronous Optical Network OC-1 rate) downstream and 1.6 Mbps to 6.5 Mbps upstream, for asymmetrical services. VDSL protocol supports data transmission rates of 6.5 Mbps to 25.9 Mbps for symmetrical services, over short two-wire loops (typically around 1 kft). Candidate modulation schemes proposed for VDSL include M-ary CAP, M-ary quadrature amplitude modulation (QAM) and DMT.

Although xDSL technologies offer the advantage of high data rates over the ubiquitous, twisted pair POTS lines, there remain areas needing improvement. One area needing improvement is in the lack of control by the customer or by the system administrator over the privileges and features, referred to in telephone parlance as the "class of service", of the customer's xDSL connection to the digital network. A primary component of the customer's class of service is the data rate of the customer's data communication session. A customer does not need, and should not have to pay for, a megabit per second data rate when sending email over the Internet. However, that same customer will require a megabit per second data rate when receiving streaming data, such as full motion digital video, over the Internet. What is needed is a way for a customer or network administrator with a web-based interface to change the class of service of the customer's xDSL connection to the digital network, referred to in telephone parlance as the customer's "local loop". What is needed is for a customer or network administrator to be able to request an immediate change in the bit rate during the customer's xDSL session. What is needed is for the customer to be able to subscribe to a service plan that automatically changes the bit rate of the customer's xDSL local loop, depending on the customer's usage or the type of data traffic occurring during a session. What is needed is for a customer or network administrator to be able to define a schedule that is followed to automatically change the bit rate of the customer's xDSL loop based on the time of the day, the day of the week, or other schedulable factors. What is needed is for a customer or network administrator to be able to select an option to automatically increase the bit rate of an xDSL loop when receiving streaming video or audio content from the Internet.

SUMMARY OF THE INVENTION

A server platform communicates with a plurality of customer digital subscriber line modems at customer sites and also communicates with an Internet service provider connected to the Internet. The server platform includes a plurality of platform digital subscriber line modems, each respectively connected to a customer digital subscriber line modem. The platform includes an Ethernet local area network (LAN) that is coupled to each of the platform digital subscriber line modems. A web server is coupled to the Ethernet LAN, and is coupled to the Internet. Customers communicate with websites on the Internet through the server platform.

In accordance with the invention, the web server in the server platform is programmed to receive requests from the customer digital subscriber line modems for changing the customer's class of service for access to the Internet. The server platform can provide an immediate change in the bit rate of a platform digital subscriber line modem in response to a customer's request. The server platform can provide a service plan that automatically changes the bit rate of a platform digital subscriber line modem in response to a customer's request. The server platform can selectively provide a schedule that is followed to automatically change the bit rate of a platform digital subscriber line modem in response to a customer's request. In addition, the server platform can selectively provide an option to automatically increase the bit rate of a platform digital subscriber line modem when receiving streaming video or audio content from the Internet. A database is coupled to the Ethernet LAN to store the class of service status of each respective platform digital subscriber line modem.

When a customer requests from the customer digital subscriber line modem, changing the customer's class of service for access to the Internet, the platform digital subscriber line modem causes an Ethernet packet containing the request, to be addressed to the web server. In response, the web server can grant the customer's request and record it in the database. An SNMP network manager coupled to the Ethernet LAN identifies the recorded request on the database and in response, forms a control message that is sent to the respective platform digital subscriber line modem that is coupled to the customer's modem. The control message changes the class of service provided by the platform digital subscriber line modem to conform with the customer's request. This mode of operation of the server platform is used to provide an immediate change in the bit rate, to provide a service plan that automatically changes the bit rate of a platform digital subscriber line modem, and to provide a schedule that is followed to automatically change the bit rate of a platform digital subscriber line modem.

The server platform includes an HTTP gateway that couples the server platform to the Internet. The gateway monitors HTTP packets received from the Internet and identifies streaming data packets that require a higher bit rate. In response to detecting the streaming packets, the HTTP gateway sends an HTTP response header field to the web server. The web server prepares an SNMP set request message specifying a high bit rate, and stores the message in the database. The web server then sends the SNMP Set Request message to the SNMP controller, which forms an Ethernet frame containing the message and sends it to the platform modem. The controller sends the control message in an Ethernet frame to the platform xDSL modem addressed by the HTTP packet, to change its bit rate. This mode of operation enables the server platform to automatically increase the bit rate of a platform xDSL modem when receiving streaming video or audio content from the Internet network.

DESCRIPTION OF THE FIGURES

FIG. 2 is a functional block diagram of the platform xDSL modem 104(X), illustrating its memory 222, CPU processor 228, xDSL interface card 232 and Ethernet interface card 230 hardware components. Also shown are the various data buffers and executable programs in its memory 222.

FIG. 2D shows state of the customer xDSL modem and the platform xDSL modem after the initial bit rate of 128 kbps has been established and stored in buffer 206(A) in the customer modem 102(A) and in buffer 208(X) in the platform modem 104(X), using the bit rate tables 202(A) and 204(X).

FIG. 2E shows state of the customer xDSL modem and the platform xDSL modem when the customer modem 102(A) requests the next higher bit rate in its table 202(A) and the platform modem 104(X) grants the request.

FIG. 2F shows state of the customer xDSL modem and the platform xDSL modem when the platform modem 104(X)

requires the customer modem 102(A) to assume the maximum bit rate in the customer's table 202(A) in order to handle incoming streaming packets.

Figure 3A:
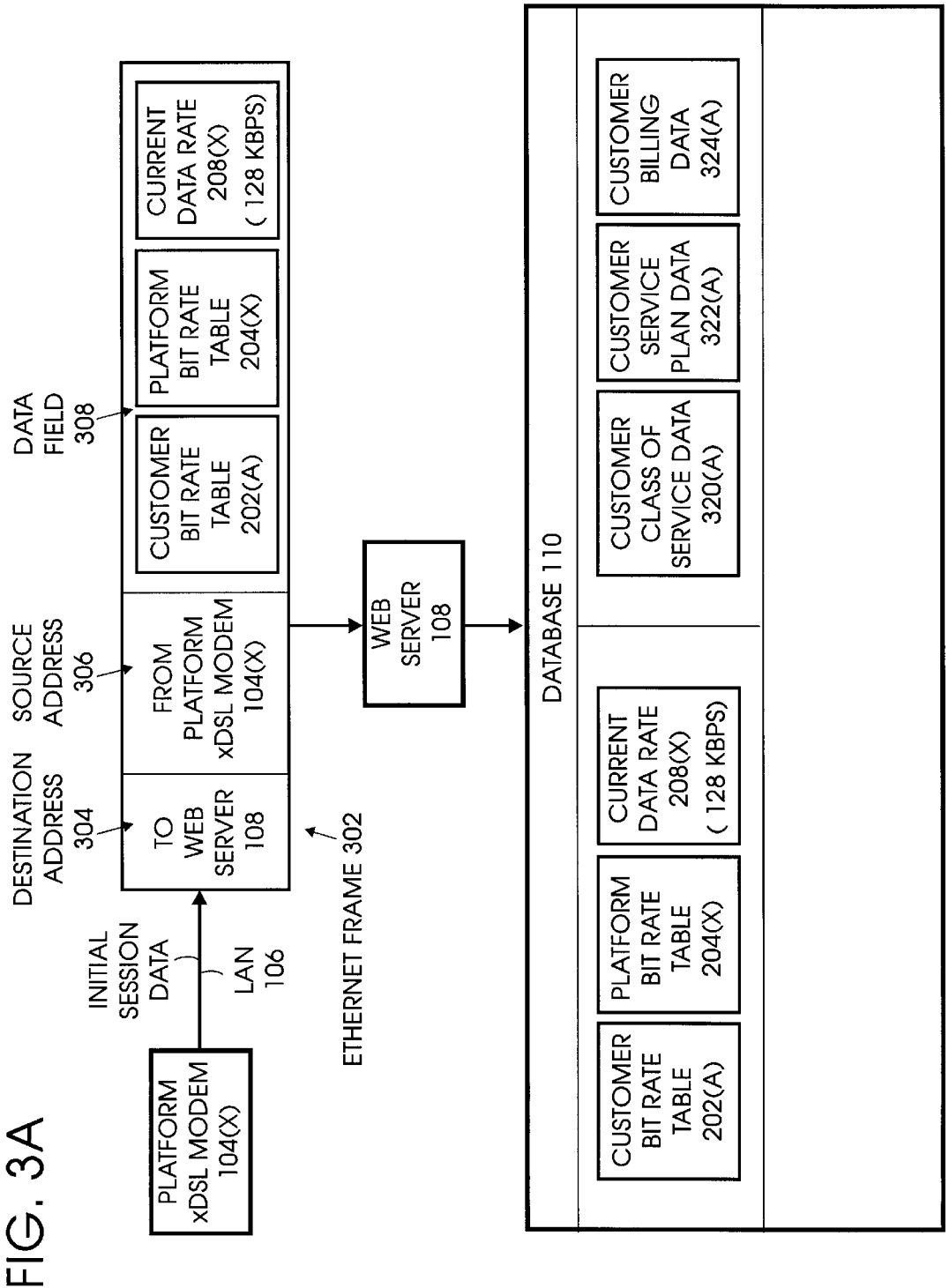

FIG. 3A is a data flow diagram showing the platform xDSL modem 104(X sending an Ethernet frame 302 to the web server 108, containing initial session data, including the initial bit rate of 128 kbps, that has resulted from the initial phase of negotiation of session parameters. The Ethernet frame is shown also containing the bit rate tables 202(A) and 204(X) of available rates for the customer modem and for the platform modem. The web server 108 is shown in responding by forwarding the initial session data and both bit rate tables to the database 110.

Figure 3B:
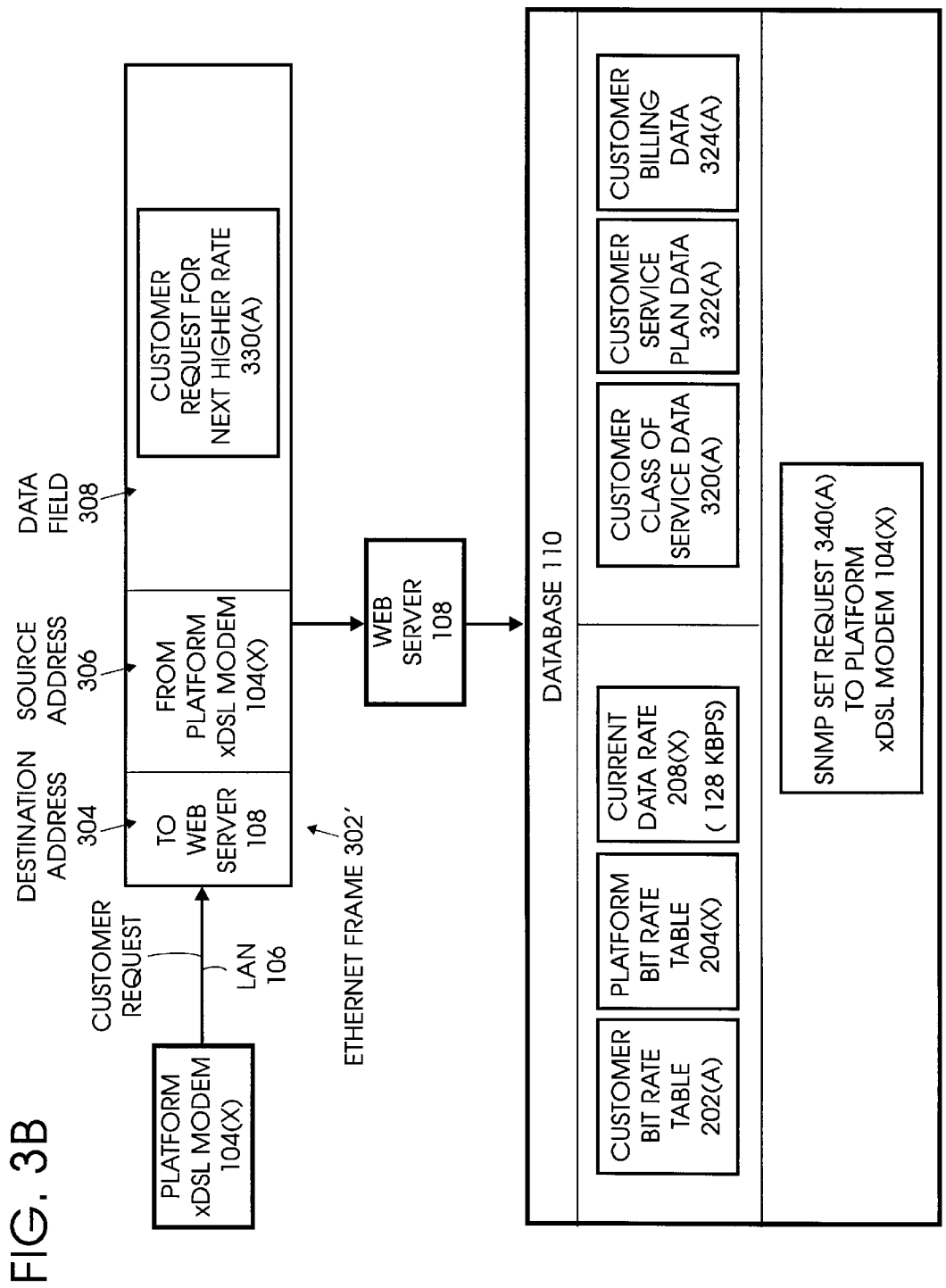

FIG. 3B is a data flow diagram showing the platform xDSL modem 104(X) sending an Ethernet frame 302' to the web server 108, containing a customer request 330(A) for the next higher bit rate in the customer's table 202(A). The web server 108 is shown in responding by forming an SNMP Set Request message "Rate=160 kbps", which is intended for the platform modem 104(X), and storing it in the database 110.

Figure 3C:
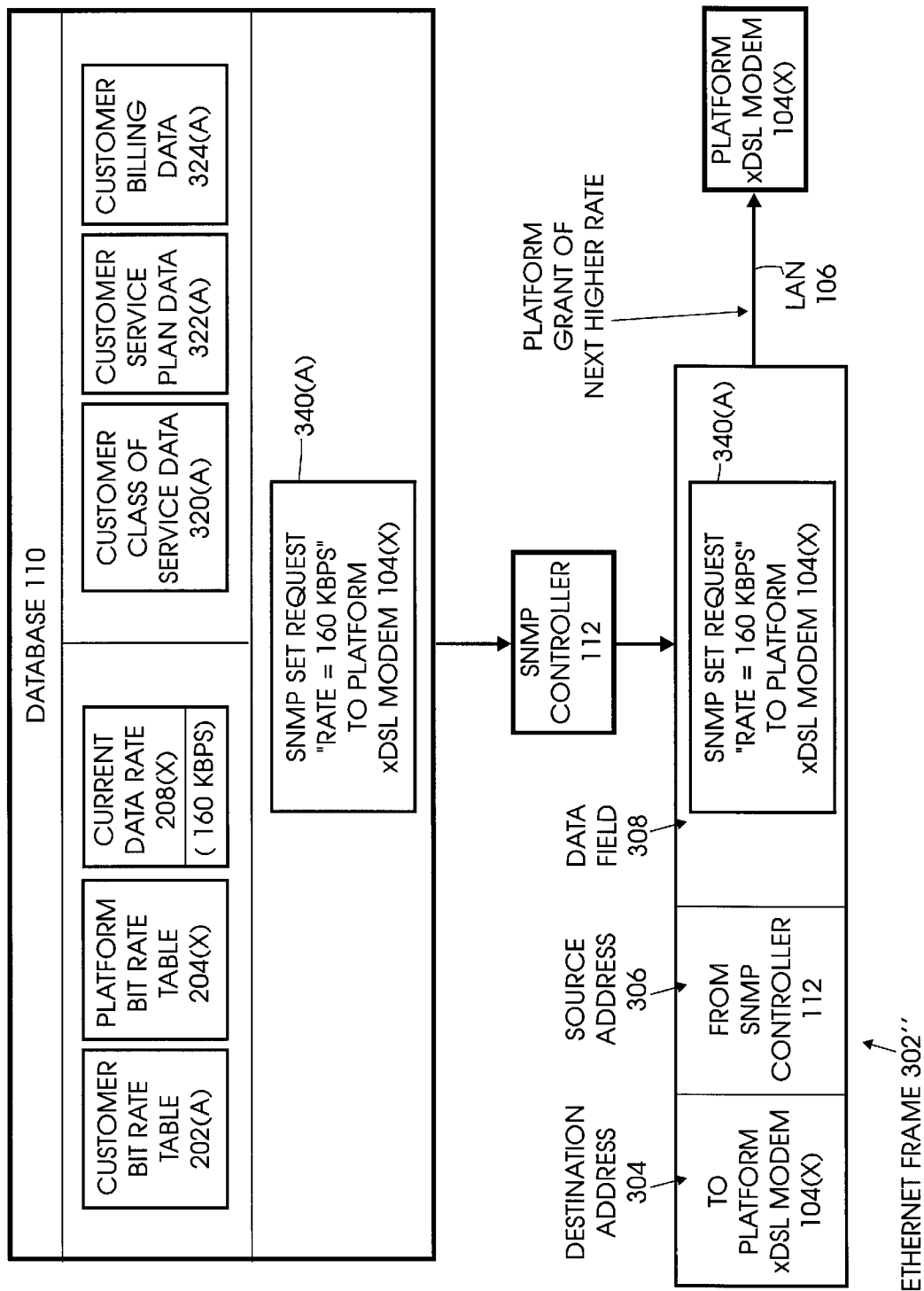

FIG. 3C is a data flow diagram showing the database 110 sending the SNMP Set Request message "Rate=160 kbps", to the SNMP controller 112, which forms an Ethernet frame 302" containing the message and sends it to the platform modem 104(X).

Figure 4A:
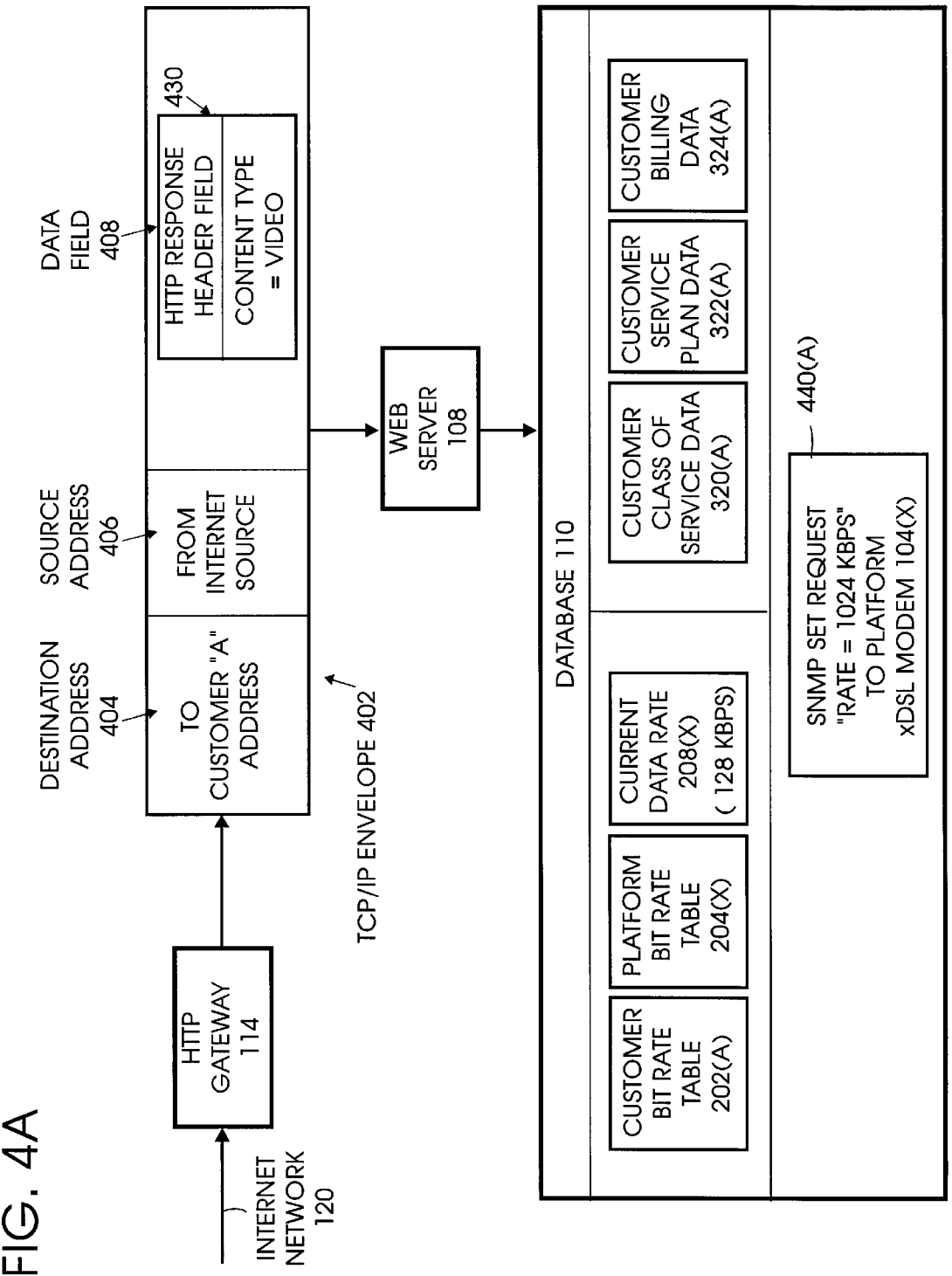

FIG. 4A is a data flow diagram showing the HTTP gateway 114 receiving a TCP/IP protocol data unit 402 from the Internet network 120, containing an HTTP header response field stating "Content Type=Video". The HTTP gateway 114 is shown forwarding the TCP/IP protocol data unit 402 to the web server 108. The web server 108 is shown in responding by forming an SNMP Set Request message "Rate=1024 kbps", which is intended for the platform modem 104(X), and storing it in the database 110.

Figure 4B:
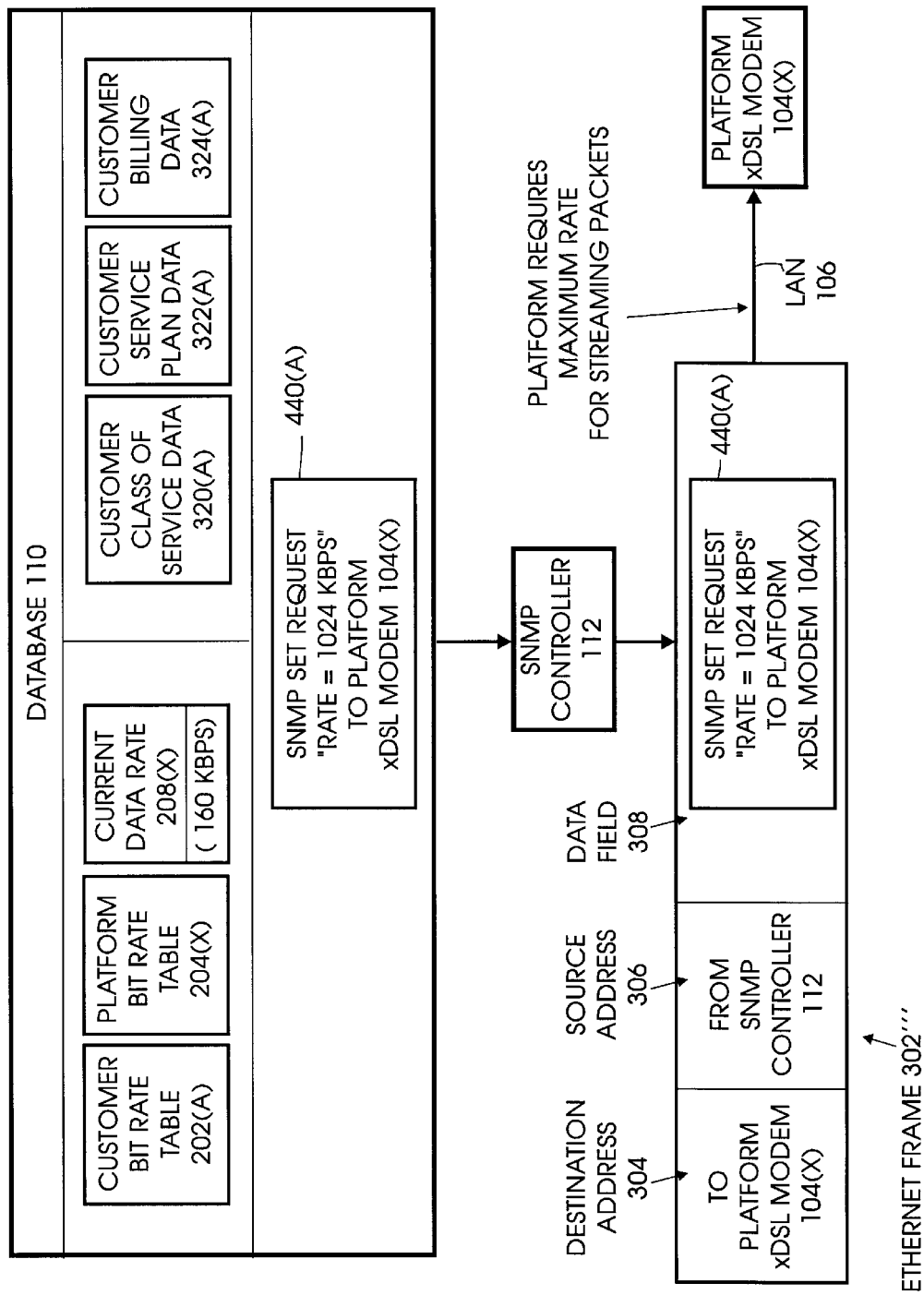

FIG. 4B is a data flow diagram showing the database 110 sending the SNMP Set Request message "Rate=1024 kbps", to the SNMP controller 112, which forms an Ethernet frame 302'" containing the message and sends it to the platform modem 104(X).

Figure 5:
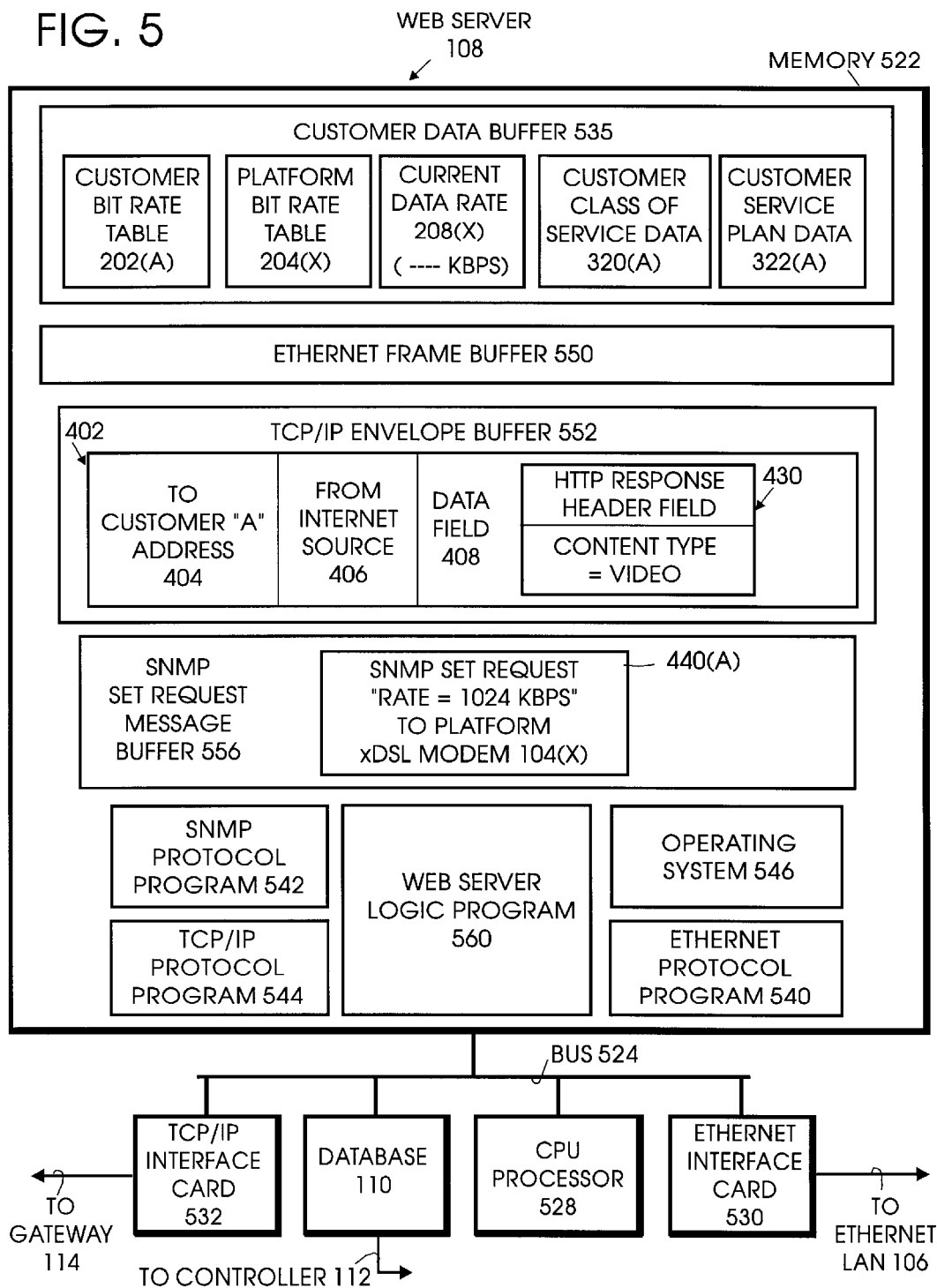

FIG. 5 is a functional block diagram of the web server 108, illustrating its memory 522, CPU processor 528, TCP/IP interface card 532 and Ethernet interface card 530 hardware components. Also shown is the database 110 which is connected to the SNMP controller 112. The various data buffers and executable programs in the web server's memory 522 are also shown.

Figure 6:
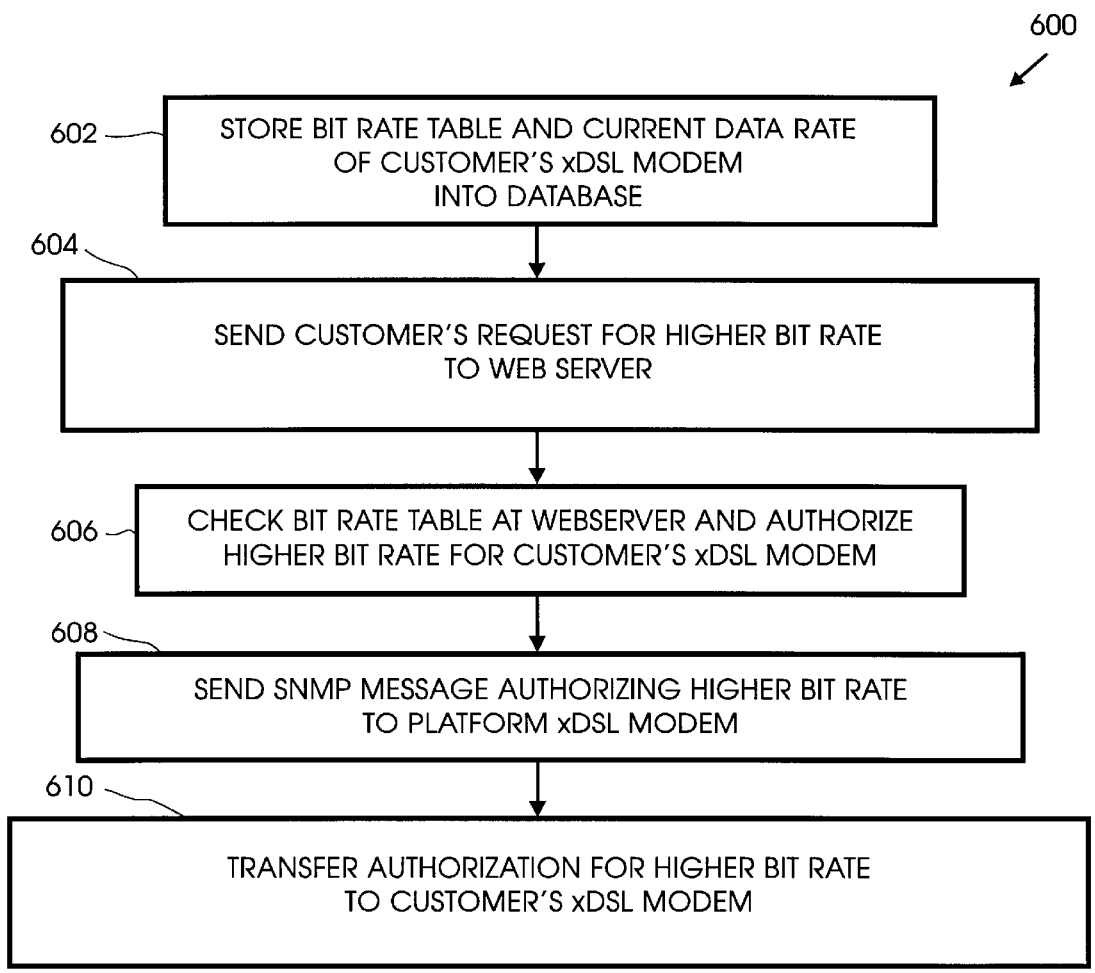

FIG. 6 is a flow diagram that illustrates the method of setting the xDSL modems to a new bit rate value in response to a request from the customer.

FIG. 7 is a flow diagram 700 that illustrates the method of preparing the xDSL modems for the receipt of the streaming data from the Internet.

DISCUSSION OF THE PREFERRED EMBODIMENT

Figure 1:
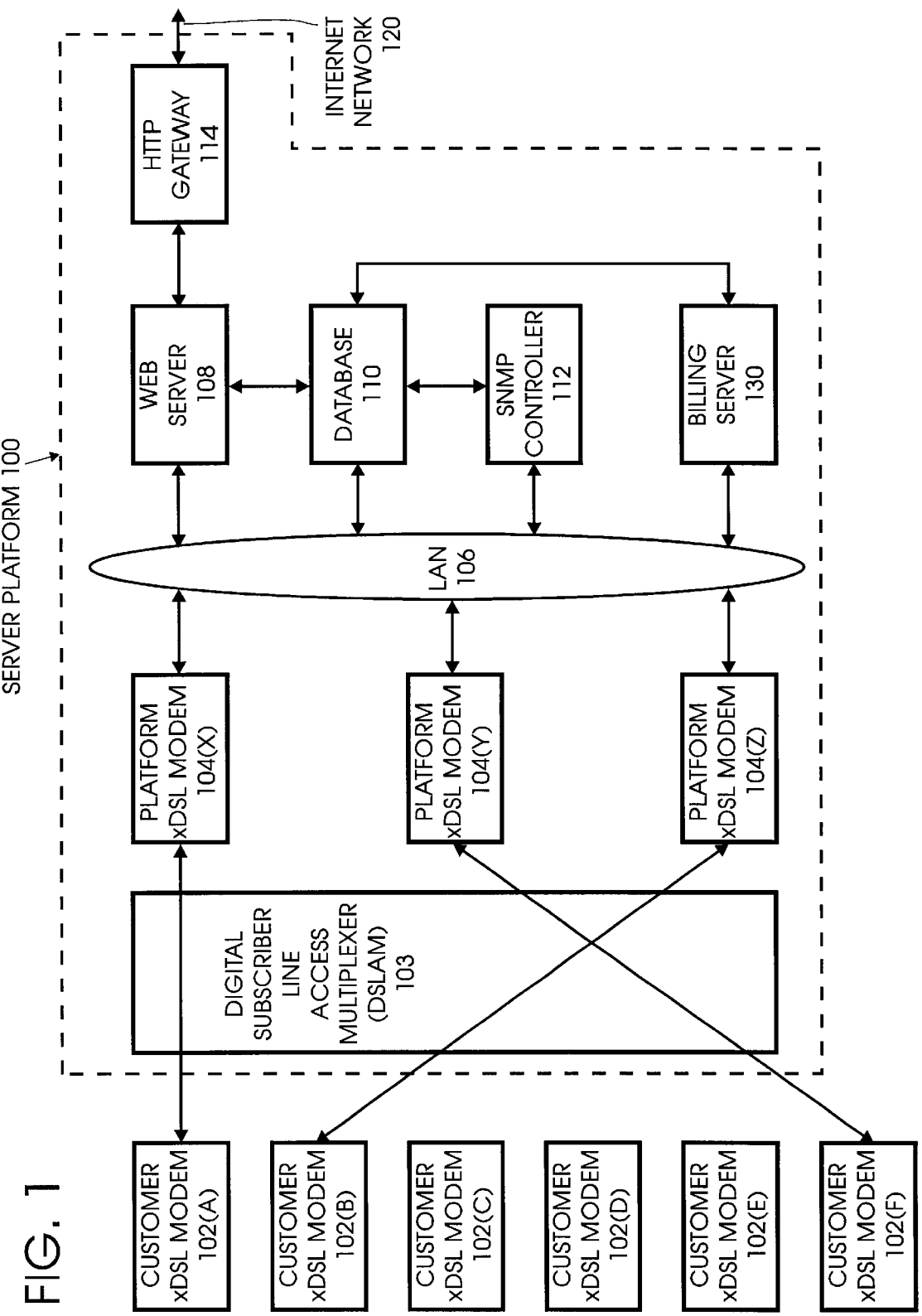
FIG. 1 is an overall architectural diagram of the server platform 100 and its relationship with the customer modems 102(A) to 102(F) and the Internet network 120.

FIG. 1 is an overall architectural diagram of the server platform 100, which communicates with a plurality of customer digital subscriber line modems, xDSL modems 102(A) to 102(F) at customer sites. It also communicates either directly with the Internet 120 or through an Internet service provider connected to the Internet 120. The server platform 100 includes a plurality of platform digital subscriber line modems, xDSL modems 104(X), 104(Y), and 104(Z), each respectively connected through the multiplexer 103 to a customer digital subscriber line modem 102(A), 102(F), and 102(B). The multiplexer 103 is a Digital Subscriber Line Access Multiplexer (DSLAM), which is a network device usually located at a telephone company central office. The DSLAM receives signals from the multiple customer xDSL modems 102(A) to 102(F) and selectively connects each to one of the platform xDSL modems 104(X), 104(Y), and 104(Z).

The platform 100 includes an Ethernet local area network (LAN) 106 that is coupled to each of the platform xDSL modems 104(X), 104(Y), and 104(Z). A web server 108 is coupled to the Ethernet LAN 103, and is coupled to the Internet 120. Customers communicate with websites on the Internet 120 through the server platform 100. An SNMP network manager controller 112 is coupled to the Ethernet LAN 106 and to the database 110. The SNMP controller can identify control messages stored on the database by the web server 108, which are intended to be forwarded by the SNMP controller to the platform xDSL modems 104(X), 104(Y), or 104(Z). The SNMP controller 112 forms an Ethernet control message that is sent to the respective platform xDSL modem to control its bit rate. The control message changes the class of service provided by the platform xDSL modem, to either conform with the customer's request or to conform with a customer service plan. A billing server 130 is coupled to the Ethernet LAN 106 and to the database 110. The billing server saves the information in the database 110 that is needed to validate a customer's good standing and to generate bills for customers. There is a wide variety of charging policies that can be implemented by the system administrator, using the billing server 130.

The platform xDSL modem 104(X) is shown in greater detail in FIG. 2. FIG. 2 is a functional block diagram of the platform xDSL modem 104(X), illustrating its memory 222, CPU processor 228, xDSL interface card 232 connected to the DSLAM 103 and Ethernet interface card 230 connected to the LAN 106. Also shown are the various data buffers and executable programs in its memory 222. The platform bit rate table 204(X) is stored in the memory 222. During the initial handshaking negotiation between the platform xDSL modem 104(X) and the customer xDSL modem 102(A), the two modems exchange their bit rate tables and the customer bit rate table 202(A) is stored in memory 222. The current data rate is buffered in buffer 208(X). The xDSL packet buffer 250 buffers xDSL packets sent to and received from the customer xDSL modems 102(A) to 102(F). The Ethernet frame buffer 252 buffers Ethernet frames sent to and received from the Ethernet LAN 106. The platform modem logic 212(X) program is a sequence of programmed instructions that, when executed by the CPU processor 228, carries out the functions of the platform xDSL modem 104(X). The Ethernet protocol program 240 handles the protocol in communicating with the LAN 106. The xDSL protocol program 244 handles the protocol in communicating with the customer xDSL modems 102(A) to 102(F). The SNMP protocol program 242 handles the protocol in performing the SNMP agent functions of the platform xDSL modem 104(X) when interacting with the SNMP controller 112 via the Ethernet LAN 106. The operating system 246 provides operating system functions for the platform xDSL modem 104(X).

Figure 2A:
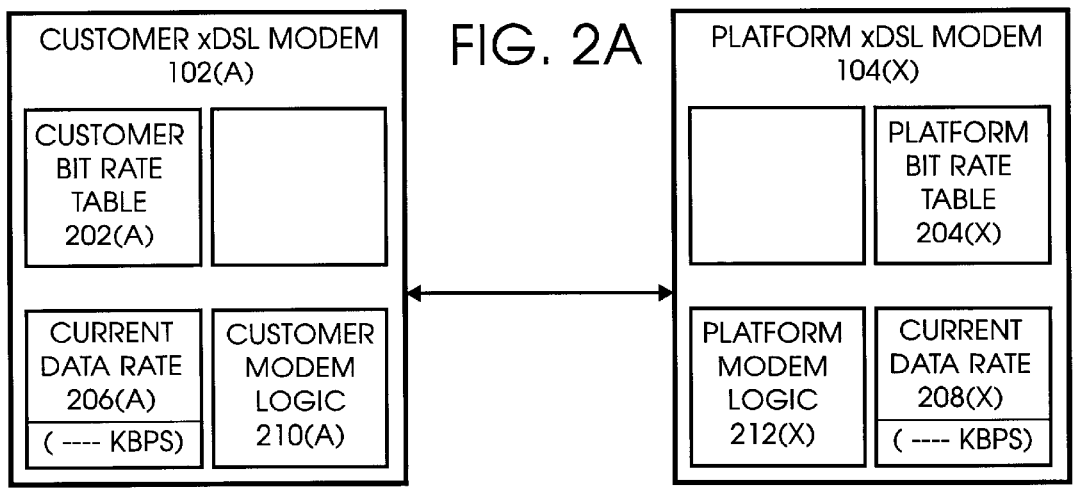
FIG. 2A shows state of the customer xDSL modem 102(A) and the platform xDSL modem 104(X) before the beginning of a session.
Figure 2B:
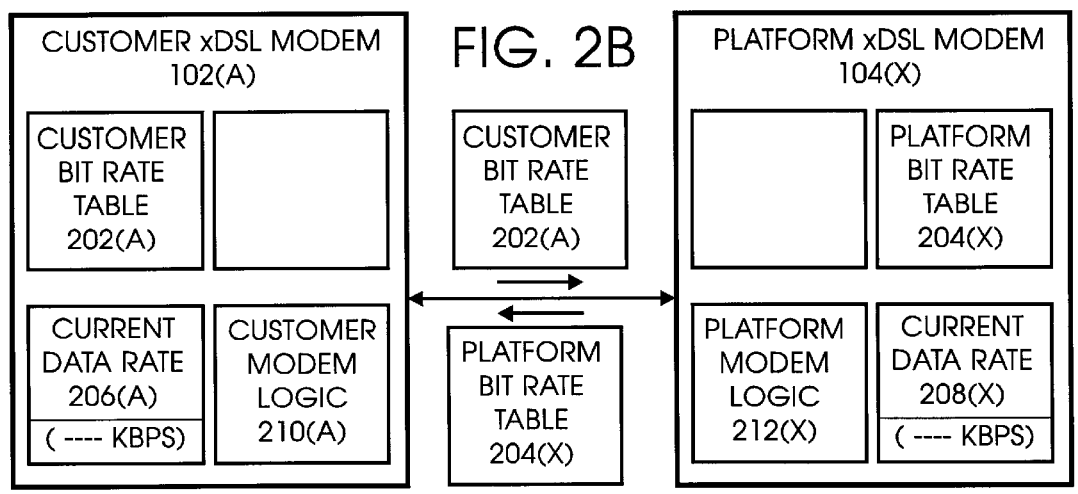
FIG. 2B shows state of the customer xDSL modem and the platform xDSL modem during the initial phase of negotiation of session parameters, when the customer bit rate table 202(A) for the customer modem 102(A) and the platform bit rate table 204(X) for the platform modem 104(X) are exchanged.
Figure 2C:
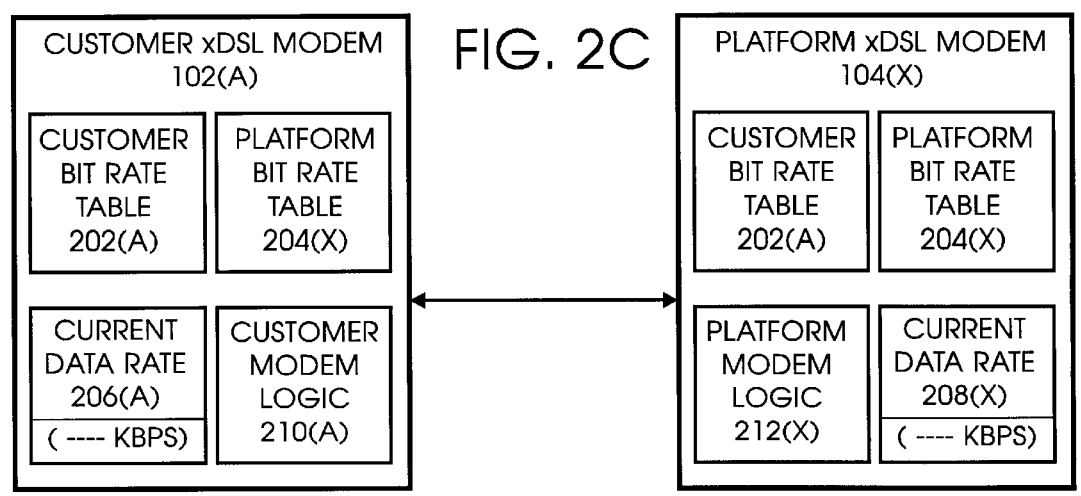
FIG. 2C shows state of the customer xDSL modem and the platform xDSL modem after the bit rate tables for the customer modem and for the platform modem have been exchanged and stored in the respective receiving modems.

FIG. 2A shows the state of the customer xDSL modem 102(A) and the platform xDSL modem 104(X) before the beginning of a session. The connection bit rate of an xDSL modem is established when the line is initially synchronized or when it is set by a signal from the central office. The modems initialize communications with one another by first listing which bit rates they support. Each modem has a bit rate table that lists the line speeds that it can support. FIG. 2B shows state of the customer xDSL modem 102(A) and the platform xDSL modem 104(X) during the initial phase of negotiation of session parameters, when the customer bit rate table 202(A) for the customer modem 102(A) and the platform bit rate table 204(X) for the platform modem 104(X) are exchanged. The exchanged tables are stored in each modem, as shown in FIG. 2C. Then they go into a test mode to determine which of the supported bit rates is the highest one which can be used for each new connection. xDSL modems poll the line before transmitting and periodically monitor the line speed during a session to determine if it is necessary to change bit rates due to changes in the line condition. If the xDSL modems recognize that they are experiencing a very low error rate over a given time period, they can agree to go to a higher bit rate. Alternatively, they can go to a lower bit rate if line conditions indicate that too many errors have occurred during some period. FIG. 2D shows state of the customer xDSL modem and the platform xDSL modem after the initial bit rate of 128 kbps has been established and stored in buffer 206(A) in the customer modem 102(A) and in buffer 208(X) in the platform modem 104)(X), using the bit rate tables 202(A) and 204(X).

The xDSL mode negotiation handshake start up procedure is the first signal exchange that occurs between two modems when making a connection. The customer xDSL modem and the platform xDSL modem exchange the customer bit rate table 202(A) for the customer modem 102(A) and the platform bit rate table 204(X) for the platform modem 104(X). This allows the modems to perform feature and mode negotiation quickly, utilizing a low speed FSK modulated signal to exchange information. Negotiation parameters include such information as: identification of xDSL modems from other types, establishing the modulation modes available, and establishing the bit rates available. Line probing allows a modem to choose the optimum operating parameters for any given telephone channel. Line probing is a bi-directional half duplex exchange which is performed during or immediately after negotiation and involves the transmission of signals that allow the distant receiver to analyze the characteristics of the telephone channel before starting data transmission. The modems use the line analysis information to choose several key operating parameters, including carrier frequency and symbol rate, pre-emphasis selection, and power control selection. Training is the process by which the modem's receiver synchronizes on the remote modem's transmit signal at initial connection establishment. Retraining is performed after a connection is up and running, to recover from disruptions, such as noise bursts, which may periodically occur during a connection. The retraining process involves many stages of receiver acquisition; automatic gain control adjustment, receiver timing acquisition, etc., all of which occur during the phase of the retraining handshake.

FIG. 3A is a data flow diagram showing the platform xDSL modem 104(X) sending an Ethernet frame 302 to the web server 108, containing initial session data, including the initial bit rate of 128 kbps, that has resulted from the initial phase of negotiation of session parameters. The Ethernet frame 302 is shown also containing in the data field 308, the bit rate tables 202(A) and 204(X) of available rates for the customer modem and for the platform modem. The web server 108 is shown in responding by forwarding the initial session data and both bit rate tables 202(A) and 204(X) to the database 110.

The Fast Ethernet protocol suitable for the LAN 106 is specified in the IEEE 802.3u standard. The platform xDSL modems 104(X), 104(Y), and 104(Z) are connected to the LAN 106 and compete for access using a carrier sense multiple access with collision detection (CSMA/CD) protocol. Fast Ethernet or 100BASE-T10 protocol provides transmission speeds up to 100 megabits per second, rates that are necessary when several customer xDSL modems are downloading streaming data, such as digital video. Gigabit Ethernet protocol specified in the Gigabit Ethernet Standard IEEE 802.3z, provides an even higher level of LAN backbone support at 1000 megabits per second and is also suitable for the LAN 106.

The Ethernet frame 302 begins with a preamble of an alternating pattern of ones and zeros which tells the receiving stations on the LAN 106 that a frame is coming. A byte before the destination address in the Ethernet frame 302 is a start-of-frame (SOF) delimiter, which ends with two consecutive one bits which serve to synchronize the frame reception portions of all stations on the LAN 106. Immediately following the preamble are the destination and source address fields 304 and 306, respectively. Ethernet addresses are six bytes long. Addresses are contained in hardware on the Ethernet interface cards 230. The first three bytes of the addresses are specified by the IEEE on a vendor-dependent basis, while the last 3 bytes are specified by the Ethernet vendor. The source address is always a unicast (single node) address, while the destination address may be unicast, multicast (group), or broadcast (all nodes). In the Ethernet frame 302, a two-byte field following the source address is a type field. This field specifies the upper-layer protocol, such as TCP/IP, to receive the data after Ethernet processing is complete. Following the type field is the actual data contained in the frame. After physical-layer and link-layer processing is complete, this data will eventually be sent to an upper-layer protocol, such as TCP/IP in the web server 108. The upper-layer protocol is identified in the type field. After the data field is a 4-byte field containing a cyclic redundancy check (CRC) value. The CRC is created by the sending device and recalculated by the receiving device to check for damage that might have occurred to the frame in transit.

The database 110 in FIG. 3A is shown storing the bit rate tables 202(A) and 204(X) of available rates for the customer modem and for the platform modem. The database 110 in FIG. 3A is shown also storing the current data rate 208(X) of 128 kbps, the customer class of service data 320(A), the customer service plan data 322(A), and the customer billing data 324(A).

FIG. 3B is a data flow diagram showing the platform xDSL modem 104(X) sending an Ethernet frame 302' to the web server 108, containing a customer request 330(A) for the next higher bit rate in the customer's table 202(A). The web server 108 is shown responding by forming an SNMP Set Request message 340(A) which specifies the next higher rate as "Rate=160 kbps", which is intended to be sent to the platform xDSL modem 104(X), and storing the message 340(A) in the database 110. In accordance with the invention, the web server 108 in the server platform 100 is programed to receive requests from the customer xDSL modem 102(A) for changing the customer's class of service for access to the Internet network 120. The server platform 100 can provide an immediate change in the bit rate of a platform xDSL modem 104(X) currently in an active session with the requesting customer modem in response to a customer's request. The platform xDSL modem 104(X) then transfers the newly granted bit rate value to the customer xDSL modem using the handshaking protocol discussed above to set a new bit rate value in the control buffer 206(A) of the customer xDSL modem 102(A).

FIG. 3C is a data flow diagram showing the database 110 sending the SNMP Set Request message 340(A) specifying "Rate=160 kbps", to the SNMP controller 112, which forms an Ethernet frame 302" containing the message 340(A) and sends it over the LAN 106 to the platform modem 104(X).

The Simple Network Management Protocol (SNMP) is a set of protocols for managing networks, such as the LAN 106. SNMP works by sending protocol data unit (PDU) messages to different parts of the network. SNMP agents store data about themselves in Management Information Bases (MIBs) and return this data to the SNMP manager. In FIG. 1, the platform xDSL modems 104(X), 104(Y), and 104(Z) are programmed to play the role of SNMP agents in the LAN 106. These agents collect information about themselves, such as their bit rate tables 204, modem parameters, current settings, and current conditions, as specified in their respective MIBs. The SNMP controller 112 is programmed to play the role of an SNMP manager in the LAN 106 network. It's the role of the SNMP manager 112 to poll the SNMP agents 104(X), 104(Y), and 104(Z) to exchange information, in this case to set new bit rate values into the current data rate buffers 208(X), 208(Y), or 208(Z), respectively. There are five types of PDU's that SNMP employs to monitor a network: two deal with reading terminal data, two deal with setting terminal data, and one, the trap, is used for monitoring network events such as terminal start-ups or shut-downs. SNMP includes a limited set of management commands and responses. The management system issues Get, GetNext and Set messages to retrieve single or multiple object variables or to establish the value of a single variable. The managed agent sends a Response message to complete the Get, GetNext or Set. The managed agent sends an event notification, called a trap to the management system to identify the occurrence of conditions, such as a threshold that exceeds a predetermined value. The five primitive operations are: (1) get (retrieve operation), (2) get next (traversal operation), (3) get response (indicative operation), (4) set (alter operation), and (5) trap (asynchronous trap operation). SNNP is discussed further in Rose, Marshall, "The Simple Book", Prentice Hall, 1994. The SNMP standard is given in the Internet Engineering Task Force (IETF) Request for Comment (RFC) 1155 and RFC 1213.

When a customer requests via the customer xDSL modem, a change in the customer's class of service for access to the Internet, the platform xDSL modem causes the Ethernet packet 302' containing the request, to be addressed to the web server 108. In response, the web server 108 can grant the customer's request and record it in the database 110. The SNMP controller 112 coupled to the Ethernet LAN 106 identifies the recorded request on the database 110 and in response, forms the Ethernet frame 302" with the control message 340(A) that is sent to the respective platform xDSL modem that is coupled to the customer's xDSL modem. The control message 340(A) changes the class of service provided by the platform xDSL modem to conform with the customer's request. This mode of operation of the server platform is used to provide an immediate change in the bit rate.

The server platform 100 can selectively provide a schedule that is followed to automatically change the bit rate of a platform xDSL modem in response to a customer's request. In addition, the server platform 100 can selectively provide an option to automatically increase the bit rate of a platform xDSL modem when receiving streaming video or audio content from the Internet. The database 110 can selectively provide a service plan that automatically changes the bit rate of a platform xDSL modem. The server platform 100 can selectively provide a schedule that is followed to automatically change the bit rate of a platform xDSL modem.

The server platform 100 includes the HTTP gateway 114 that couples the server platform 100 to the Internet network 120. The gateway 114 monitors HTTP packets received from the Internet network 120 and identifies streaming data packets that require a higher bit rate. In response to detecting the streaming packets, the HTTP gateway 114 sends the HTTP response header field 430 of FIG. 4A to the web server 108. In response, the web server 108 prepares an SNMP set request message 440(A) specifying a high bit rate "Rate=1024 kbps", and stores message 440(A) in the database 110. The database 110 then sends the SNMP Set Request message "Rate=1024 kbps" to the SNMP controller 112, which forms an Ethernet frame 302''' containing the message and sends it to the platform modem 104(X). The controller 112 sends the control message 440(A) in an Ethernet frame 302''' to the platform xDSL modem addressed by the HTTP packet, to change its bit rate. This mode of operation enables the server platform 100 to automatically increase the bit rate of a platform xDSL modem when receiving streaming video or audio content from the Internet network 120. FIG. 4A is a data flow diagram showing the HTTP gateway 114 receiving a TCP/IP protocol data unit 402 from the Internet network 120, containing an HTTP header response field stating "Content Type=Video/Streaming Video". Typically, this is an initial warning message sent by the Internet source in response to a previous request from the platform for the streaming data, to insure that the platform is capable of handling the much larger streaming data packets. The initial warning TCP/IP protocol data unit contains only the HTTP header and not the much larger streaming data. The HTTP gateway 114 is shown forwarding the TCP/IP protocol data unit 402 to the web server 108. The web server 108 is shown in responding by forming an SNMP Set Request message "Rate=1024 kbps", which is intended for the platform modem 104(X), and storing it in the database 110. FIG. 4B is a data flow diagram showing the database 110 sending the SNMP Set Request message "Rate=1024 kbps", to the SNMP controller 112, which forms an Ethernet frame 302''' containing the message and sends it to the platform modem 104(X).

In response to the SNMP set request message from the SNMP controller 112, the platform modem 104(X) prepares for the receipt of the streaming data by setting its bit rate to the new, higher speed. The magnitude of the new higher speed has been specified as an available speed of operation for the customer's xDSL modem 102(A), by the customer's bit rate table 202(A) in the database 110. After the platform modem 104(X) successfully sets its bit rate to the new, higher speed, it signals the customer's xDSL modem 102(A) to set its bit rate to the new, higher speed, in an xDSL handshaking protocol. Then, platform modem 104(X) responds with an SNMP trap PDU message over the Ethernet LAN 106 back to the SNMP controller 112 indicating that the platform modem 104(X) and the customer's xDSL modem 102(A) are ready to handle the streaming data. In response, the SNMP controller 112 sends a message on the Ethernet LAN 106 to the web server 108 that the platform modem 104(X) is ready to handle the streaming data. Then, in response, the web server 108 sends an HTTP control message to the HTTP gateway 114 for forwarding to the Internet network 120 within a TCP/IP protocol data unit, indicating that the platform modem 104(X) is ready to handle the streaming data. Then, when the source of the data on the Internet network 120 begins its transfer of the streaming data packets to the platform 100, the data will be efficiently handled by the platform modem 104(X) and the customer's xDSL modem 102(A).

HyperText Transfer Protocol (HTTP) defines how messages are formatted and transmitted on the Internet network 120, and what actions Web servers and browsers should take in response to various commands. HTTP version 1.0 was never made an official Internet standard, but the de facto standard is described in IETF RFC 1945. HTTP version 1.1 is described in the IETF RFC 2068, January 1997, "Hypertext Transfer Protocol—HTTP/1.1". Other IETF documents describing various features of the HTTP protocol are: RFC 822 which describes the structure of Internet text messages, including header fields, RFC 1738 which describes the definition of URL syntax, RFC 1808 which describes the definition of relative URL syntax, and RFC 1521 which describes the definition of MIME and of MIME types. WWW pages are written in the Hypertext Markup Language (HTML), an ASCII-based, platform-independent formatting language described in RFC 1866.

TCP/IP protocol is described in "Internetworking with TCP/IP, Vol. I: Principles, Protocols, and Architecture", second edition, by D. Comer (Prentice-Hall, 1991). Another reference is "TCP/IP: Architecture, Protocols, and Implementation with IPv6 and IP Security", second edition. by S. Feit (McGraw-Hill, 1997). Still other references include "TCP/IP Tutorial" by T. J. Socolofsky and C. J. Kale, IETF RFC 1180, and "TCP/IP Illustrated, Volume I: The Protocols" by W. R. Stevens (Addison-Wesley, 1994).

FIG. 5 is a functional block diagram of the web server 108, illustrating its memory 522, CPU processor 528, TCP/IP interface card 532 and Ethernet interface card 530 hardware components. Also shown is the database 110 which is connected to the SNMP controller 112. The various data buffers and executable programs in the web server's memory 522 are also shown. Customer data buffer 535 stores the platform bit rate table 204(X), the customer bit rate table 202(A), the current data rate is buffered in buffer 208(X), the customer class of service 320(A) and the customer service plan 322(A). The Ethernet frame buffer 550 buffers Ethernet frames sent to and received from the Ethernet LAN 106. The TCP/IP protocol data unit buffer 552 buffers TCP/IP protocol data units sent and received over the Internet 120. The SNMP set request message buffer 556 buffers message 440(A) formed by the web server 108. The web server logic program 560 is a sequence of programmed instructions that, when executed by the CPU processor 528, carries out the functions of the web server 108. The Ethernet protocol program 540 handles the protocol in communicating with the LAN 106. The TCP/IP protocol program 544 handles the protocol in communicating with the HTTP gateway 114 and the Internet network 120. The SNMP protocol program 542 handles the protocol in performing the SNMP manager functions of the web server 108 when forming SNMP set request messages 340(A) and 440(A) to be sent to the SNMP agents via the SNMP controller 112 and the Ethernet LAN 106. The operating system 546 provides operating system functions for the web server 108.

FIG. 6 is a flow diagram 600 that illustrates the method of setting the xDSL modems to a new bit rate value in response to a request from the customer.

In Step 602: the database 110 stores the bit rate tables 202(A) and 204(X) of available rates for the customer modem and for the platform modem. The database 110 in FIG. 3A is shown also storing the current data rate 208(X) of 128 kbps, the customer class of service data 320(A), the customer service plan data 322(A), and the customer billing data 324(A).

In Step 604: the platform xDSL modem 104(X) sends an Ethernet frame 302' to the web server 108, containing a customer request 330(A) for the next higher bit rate in the customer's table 202(A).

In Step 606: the web server 108 responds by forming an SNMP Set Request message 340(A) which specifies the next higher rate as "Rate=160 kbps", which is intended to be sent to the platform xDSL modem 104(X), and stores the message 340(A) in the database 110.

In Step 608: database 110 transfers the SNMP Set Request message 340(A) specifying "Rate=160 kbps", to the SNMP controller 112, which forms an Ethernet frame 302" containing the message 340(A) and sends it over the LAN 106 to the platform modem 104(X).

In Step 610: the platform xDSL modem 104(X) then transfers the newly granted bit rate value to the customer xDSL modem using a handshaking protocol to set a new bit rate value in the control buffer 206(A) of the customer xDSL modem 102(A).

The flow diagram 700 of FIG. 7 illustrates the method of preparing the xDSL modems for the receipt of the streaming data from the Internet. The method comprises the following steps:

Step 702: The platform 100 receives an initial HTTP warning message in a TCP/IP protocol data unit sent by the Internet source in response to a previous request from the platform for the streaming data, to insure that the platform is capable of handling the much larger streaming data packets. The initial HTTP warning message contains only the HTTP response header and not the much larger streaming data.

Step 704: The gateway 114 monitors HTTP packets received from the Internet network 120 and identifies HTTP headers that specify streaming data packets that require a higher bit rate.

Step 706: In response to detecting the HTTP warning message, the HTTP gateway 114 sends the HTTP response header field 430 of FIG. 4A to the web server 108.

Step 707: In response, the web server 108 prepares an SNMP set request message 440(A) specifying a high bit rate "Rate=1024 kbps", and stores message 440(A) in the database 110.

Step 708: The database 110 then sends the SNMP Set Request message "Rate=1024 kbps" to the SNMP controller 112, Step 710: The SNMP controller 112 forms an Ethernet frame 302''' containing the message and sends it to the platform modem 104(X). The controller 112 sends the control message 440(A) in an Ethernet frame 302''' to the platform xDSL modem addressed by the HTTP packet, to change its bit rate.

Step 712: In response to the SNMP set request message from the SNMP controller 112, the platform modem 104(X) prepares for the receipt of the streaming data by setting its bit rate to the new, higher speed. The magnitude of the new higher speed has been specified as an available speed of operation for the customer's xDSL modem 102(A), by the customer's bit rate table 202(A) in the database 110.

Step 714: After the platform modem 104(X) successfully sets its bit rate to the new, higher speed, it signals the customer's xDSL modem 102(A) to set its bit rate to the new, higher speed, in an xDSL handshaking protocol.

Step 716: Then, platform modem 104(X) responds with an SNMP trap PDU message over the Ethernet LAN 106 back to the SNMP controller 112 indicating that the platform modem 104(X) and the customer's xDSL modem 102(A) are ready to handle the streaming data.

Step 718: In response, the SNMP controller 112 sends a message on the Ethernet LAN 106 to the web server 108 that the platform modem 104(X) is ready to handle the streaming data.

Step 720: Then, in response, the web server 108 sends an HTTP control message to the HTTP gateway 114 for forwarding to the Internet network 120 within a TCP/IP protocol data unit, indicating that the platform modem 104(X) is ready to handle the streaming data.

Step 722: Then, when the source of the data on the Internet network 120 begins its transfer of the streaming data packets to the platform 100, the data will be efficiently handled by the platform modem 104(X) and the customer's xDSL modem 102(A).

Web Pages

The user interface for this service is provided by multiple Web pages that are dynamically generated by the web server 108. Representative samples of these Web pages are shown on the following Tables 1, 2, 3 and 4.

There are several technologies in the current art that can be used to dynamically generate Web pages. These include Active Server Pages (ASP), Servlets, and Common Gateway Interface (CGI) scripts. Any of these mechanisms can be used by the web server 108 to generate the Web pages that are described on the following tables.

Note: In order to change the bit rate of an xDSL access link, the modems 102(A) and 104(X), for example, on both ends of the access link must be powered on. Otherwise, the request must either be denied or be queued for a later time.

A customer or network administrator can request an immediate change in the bit rate of an xDSL modem 102(A), for example, by using the sample Web page shown in the following Table 1 generated by the web server 108.

TABLE 1

Immediate Modem Rate Change

| | Peak Downstream Bit Rate | Typical Application | Price |
|---|---|---|---|
| N | 128 kbps | Web Browsing, IP Telephony | $10/month |
| | 9 Automatic bit rate increase for streaming content (Additional $5/month) | | |
| • | 256 kpbs | Streaming Internet Video and Audio | $15/month |
| | : Automatic bit rate increase for streaming content (Additional $5/month) | | |
| N | 512 kbps | Higher Quality Streaming Internet Video and Audio | $25/month |
| N | 1.5 Mbps | VHS Quality Streaming Internet Video and Audio | $35/month |

Submit

A customer or network administrator can select an xDSL modem rate schedule option for the customer service plan data 322(A) by using a Web page similar to that shown on the following Table 2. In addition to time-of-day, day-of-week information can also be used to define an xDSL modem rate schedule.

TABLE 2 xDSL Modem Rate Schedule Options
Note: Bit rates are peak downstream

• Option #1 ($5/month):

| | |
|---|---|
| 10 AM–10 PM | 128 kbps (Web Browsing, IP Telephony) |
| 10 PM–10 AM | 256 kbps (Streaming Internet Audio and Video) |

N Option #2 ($10/month):

| | |
|---|---|
| 10 AM–10 PM | 512 kbps (Higher Quality Streaming Internet Audio and Video) |
| 10 PM–10 AM | 1.5 Mbps (VHS Quality Streaming Internet Video) |

N Option #3 ($20/month):

| | |
|---|---|
| 24 hour | 1.5 Mbps (VHS Quality Streaming Internet Video) |

Automatic bit rate increase for streaming content

A customer or network administrator can display a custom modem rate schedule option by using the following sample Web page in Table 3 generated by the web server 108. Notice that an estimate of the monthly charge for this schedule is shown. The Modify button enables the customized schedule to be modified.

TABLE 3

Customized xDSL Modem Rate Schedule
Note: Bit rates are peak downstream

| Interval | Peak Downstream Bit Rate |
|---|---|
| 8 PM–12 AM | 1.5 Mbps (VHS Quality Internet Video) |
| 12 AM–8 PM | 128 Kbps (Web Browsing, IP telephony) |

Monthly Charge: $8.50

Modify

A customer or network administrator can modify a customized xDSL modem rate schedule by using the Web page shown on the following Table 4 generated by the webserver 108.

The day-of-week field is used to specify the schedule for a particular day. The choice element contains one entry for each day of the week. In addition, it contains an entry "All" that corresponds to all days of the week. An entry "Weekend" corresponds to Saturday and Sunday. An entry "Weekday" corresponds to Monday through Friday.

The Start Hour, End Hour, and Peak Downstream Bit Rate are required fields.

The Monthly Charge is dynamically updated as the other fields on this page are modified.

When all entries on the page have been completed, the Submit button is pressed to update the database.

TABLE 4

Modify Customized xDSL Modem Rate Schedule

Day-of-Week [Saturday ▼]

[8 AM ▼] End Hour [8 PM ▼]

Peak Downstream Bit Rate:
[1.5 Mbps (Large Sortware Downloads) ▼]

Monthly Charge: [$15.00]

Modify Customized xDSL Modem Rate Schedule

Day-of-Week [Saturday ▼]

Start Hour [8 AM ▼] End Hour [8 PM ▼]

Peak Downstream Bit Rate:
[1.5 Mbps (Large Sortware Downloads) ▼]

Monthly Charge: [$15.00]

Note: The Day-of-Week, Peak Downstream Bit Rate, Start Hour, and End Hour elements provide pull-down menus.

Note: The Day-of-Week, Peak Downstream Bit Rate, Start Hour, and End Hour elements provide pull-down menus.

Database Information

The database 110 contains the following information:
(1) The configuration information for each xDSL modem in the customer class of service data 320(A). Specifically, the data indicates the IP address of each xDSL modem, the end user who is assigned to that equipment, and the IP address assigned to the end user PC.
(2) The schedule information for each xDSL modem in the customer service plan data 322(A). Specifically, the data indicate the bit rate that should be used at various times during each day.
(3) The history of immediate bit rate changes for each xDSL modem in the customer billing data 324(A). Specifically, the data indicates when a customer requested an immediate bit rate change and the new bit rate.

Billing System

The billing system provided by the billing server 130 saves the information that is needed to generate bills for customers. There are a wide variety of charging policies that can be implemented by the provider of this service.

The resulting invention enables a customer or network administrator with a web-based interface, to change the class of service of the customer's xDSL connection to the digital network. It enables a customer or network administrator to request an immediate change in the bit rate during the customer's xDSL session. It enables the customer to subscribe to a service plan that automatically changes the bit rate of the customer's xDSL local loop, depending on the customer's usage or the type of data traffic occurring during a session. It enables a customer or network administrator to define a schedule that is followed to automatically change the bit rate of the customer's xDSL loop based on the time of the day, the day of the week, or other schedulable factors. The resulting invention allows a customer or network administrator to select an option to automatically increase the bit rate of an xDSL loop when receiving streaming video or audio content from the Internet.

Various illustrative examples of the invention have been described in detail. In addition, however, many modifications and changes can be made to these examples without departing from the nature and spirit of the invention.

What is claimed is:

1. A server platform in a telecommunications network, comprising:
    a plurality of platform digital subscriber line modems, each respectively connected to a customer digital subscriber line modem;
    a local area network (LAN) coupled to each of the platform digital subscriber line modems;
    a web server in the server platform coupled to the LAN, and coupled to a network;
    said customers communicating with websites on the network through the server platform;
    said web server in the server platform programmed to receive requests from the customer digital subscriber line modems for changing the customer's class of service for access to the network; and
    said web server in the server platform providing a change in the bit rate of a platform digital subscriber line modem in response to a customer's request.

2. The server platform in a telecommunications network of claim 1, further comprising:
    said web server in the server platform providing a service plan that automatically changes the bit rate of a platform digital subscriber line modem in response to a customer's request.

3. The server platform in a telecommunications network of claim 1, further comprising:
    said web server in the server platform providing a schedule to be followed to automatically change the bit rate of a platform digital subscriber line modem in response to a customer's request.

4. The server platform in a telecommunications network of claim 1, further comprising:
    said server platform automatically increasing the bit rate of a platform digital subscriber line modem when receiving streaming video or audio content from the network.

5. The server platform in a telecommunications network of claim 1, further comprising:
    a database is coupled to the LAN to store the class of service status of each respective platform digital subscriber line modem.

6. The server platform in a telecommunications network of claim 1, further comprising:
    said platform digital subscriber line modem causing a packet containing the request to be addressed to the web server, when a customer requests changing the customer's class of service for access to the network;

in response, said web server granting the customer's request and recording it in the database;

an SNMP controller coupled to the LAN for identifying the recorded request on the database and in response, forming a control message and sending it to the respective platform digital subscriber line modem coupled to the customer's modem;

said control message changing the class of service provided by the platform digital subscriber line modem to conform with the customer's request.

7. The server platform in a telecommunications network of claim 1, further comprising:

a gateway in the platform that couples the server platform to the network;

said gateway monitoring packets received from the network and identifying streaming data packets that require a higher bit rate;

in response to detecting the streaming packets, said gateway communicating with said web server, the web server responding by forming a control message and recording it in the database;

a controller coupled to the LAN for identifying the recorded control message on the database and in response, forming a control message and sending it to the respective platform digital subscriber line modem coupled to the customer's modem;

said control message changing the class of service provided by the platform digital subscriber line modem to handle said streaming data packets; and whereby the server platform automatically increases the bit rate of a platform digital subscriber line modem when receiving streaming video or audio content from the network.

8. A server method in a telecommunications network, comprising:

receiving requests at a server platform from customer digital subscriber line modems for changing a customer's class of service for access to a network; and providing a change in bit rate of a platform digital subscriber line modem in response to a customer's request.

9. The server method in a telecommunications network of claim 8, further comprising:

said web server in the server platform providing a service plan that automatically changes the bit rate of a platform digital subscriber line modem in response to a customer's request.

10. The server method in a telecommunications network of claim 8, further comprising:

said web server in the server platform providing a schedule to be followed to automatically change the bit rate of a platform digital subscriber line modem in response to a customer's request.

11. The server method in a telecommunications network of claim 8, further comprising:

said server platform automatically increasing the bit rate of a platform digital subscriber line modem when receiving streaming video or audio content from the network.

12. The server method in a telecommunications network of claim 8, further comprising:

storing a class of service status of each respective platform digital subscriber line modem in a database in the platform.

13. The server method in a telecommunications network of claim 8, further comprising:

causing an Ethernet packet containing the request to be addressed to the server, when a customer requests changing the customer's class of service for access to the network;

in response, said server granting the customer's request and recording it in a database;

identifying the recorded request in the database and in response, forming a control message and sending it to the respective platform digital subscriber line modem coupled to the customer's modem;

said control message changing the class of service provided by the platform digital subscriber line modem to conform with the customer's request.

14. The server method in a telecommunications network of claim 8, further comprising:

monitoring HTTP packets received from the network and identifying streaming data packets that require a higher bit rate;

in response to detecting the streaming packets, communicating with said server, the server responding by forming a control message and recording it in a database;

identifying the recorded control message in the database and in response, forming a control message and sending it to the respective platform digital subscriber line modem coupled to the customer's modem;

said control message changing the class of service provided by the platform digital subscriber line modem to handle said streaming data packets;

whereby the server automatically increases the bit rate of a platform digital subscriber line modem when receiving streaming video or audio content from the network.

15. The server method in a telecommunications network of claim 8, further comprising:

receiving billing information at a billing server in said platform for maintaining a customer's billing record; and providing validation of a customer's good standing before providing service to said customer, based on said billing record.

16. A server method in a telecommunications network, comprising:

receiving customer class of service information for a customer digital subscriber line modem at a database in a server platform;

receiving a request at the server platform from said modem for a new class of service for said modem;

determining from said class of service information in said database whether said new class of service is included in said information; and providing to said modem said new class of service in response to said request.

17. The server method in a telecommunications network of claim 16, further comprising:

said server platform providing a service plan that automatically changes the class of service of said modem in response to a customer's request.

18. The server method in a telecommunications network of claim 16, further comprising:

said server platform providing a schedule to be followed to automatically change the class of service of said modem in response to a customer's request.

19. The server method in a telecommunications network of claim 16, further comprising:

said server platform automatically increasing the bit rate of said modem when receiving streaming video or audio data.

20. The server method in a telecommunications network of claim 16, further comprising:

receiving billing information at a billing server in said platform for maintaining a customer's billing record; and providing validation of a customer's good standing before providing service to said customer, based on said billing record.

21. A server method in a telecommunications network, comprising:

receiving customer bit rate information for a customer digital subscriber line modem at a database in a server platform;

receiving a request at the server platform from said modem for a new bit rate for said modem;

determining from said bit rate information in said database whether said new bit rate is included in said information; and providing to said modem said new bit rate in response to said request.

22. The server method in a telecommunications network of claim 21, further comprising:

said server platform providing a service plan that automatically changes the bit rate of said modem in response to a customer's request.

23. The server method in a telecommunications network of claim 21, further comprising:

said server platform providing a schedule to be followed to automatically change the bit rate of said modem in response to a customer's request.

24. The server method in a telecommunications network of claim 21, further comprising:

said server platform automatically increasing the bit rate of said modem when receiving streaming video or audio data.

25. The server method in a telecommunications network of claim 21, further comprising:

receiving billing information at a billing server in said platform for maintaining a customer's billing record; and providing validation of a customer's good standing before providing service to said customer, based on said billing record.

26. A server method in a telecommunications network, comprising:

receiving customer bit rate information for a customer digital subscriber line modem at a database in a server platform;

detecting streaming data arriving at said server platform from said network;

determining from said bit rate information in said database whether a higher bit rate is included in said information; and providing to said modem said higher bit rate in response to detecting said streaming data.

27. The server method in a telecommunications network of claim 26, further comprising:

said server platform providing a service plan that automatically changes the bit rate of said modem in response to a customer's request.

28. The server method in a telecommunications network of claim 26, further comprising:

said server platform providing a schedule to be followed to automatically change the bit rate of said modem in response to a customer's request.

29. The server method in a telecommunications network of claim 26, further comprising:

receiving billing information at a billing server in said platform for maintaining a customer's billing record; and providing validation of a customer's good standing before providing service to said customer, based on said billing record.

* * * * *